Patented Nov. 3, 1942

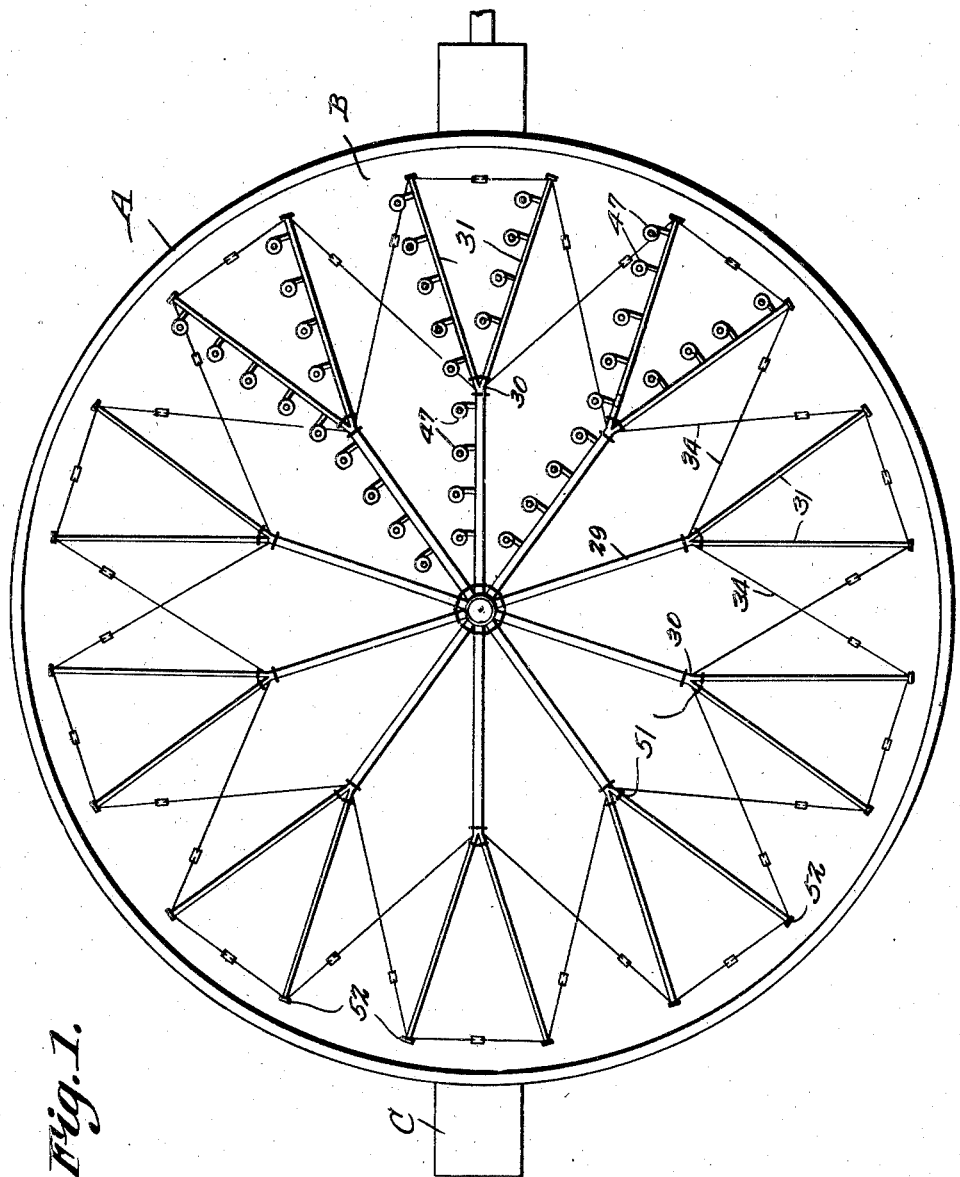

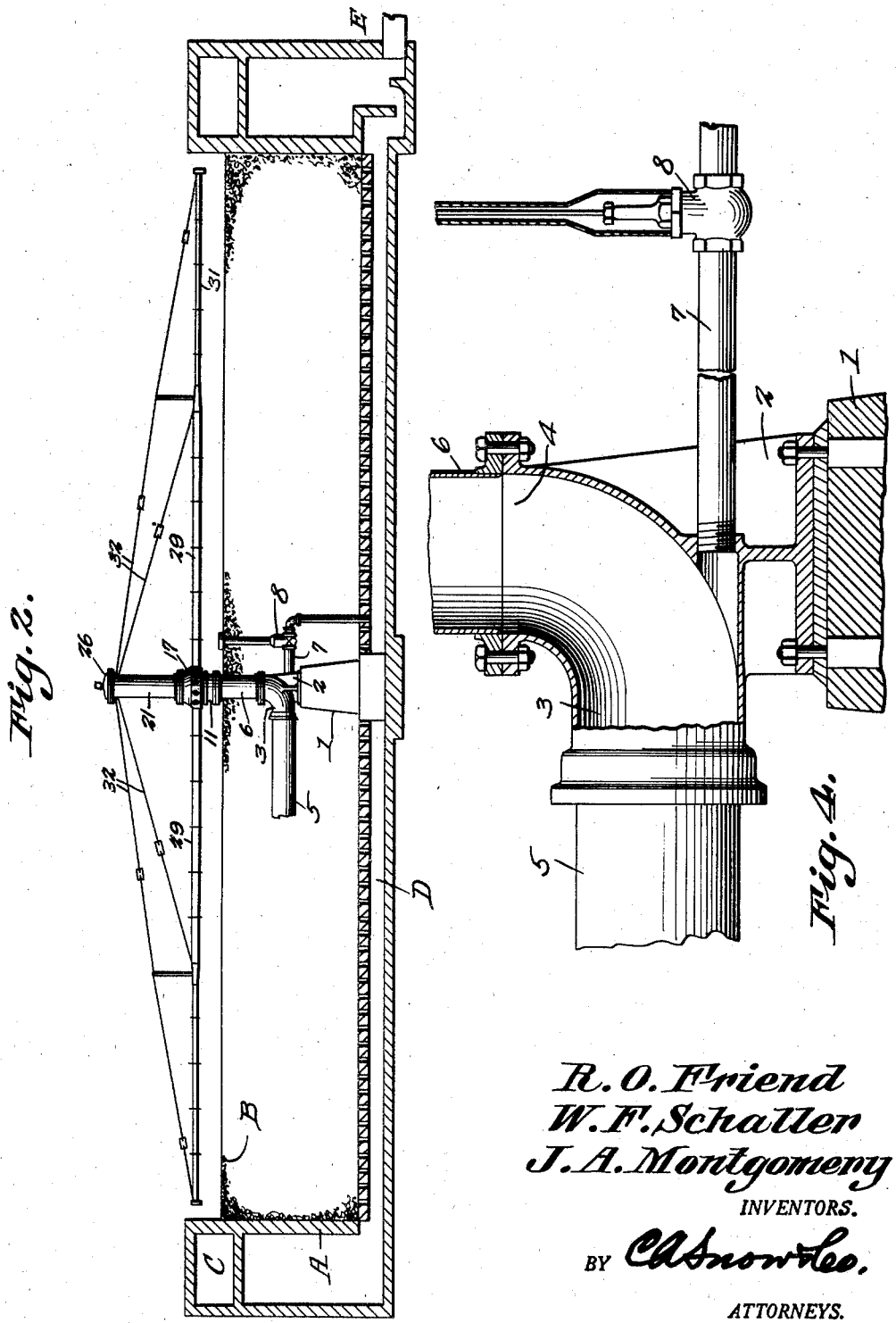

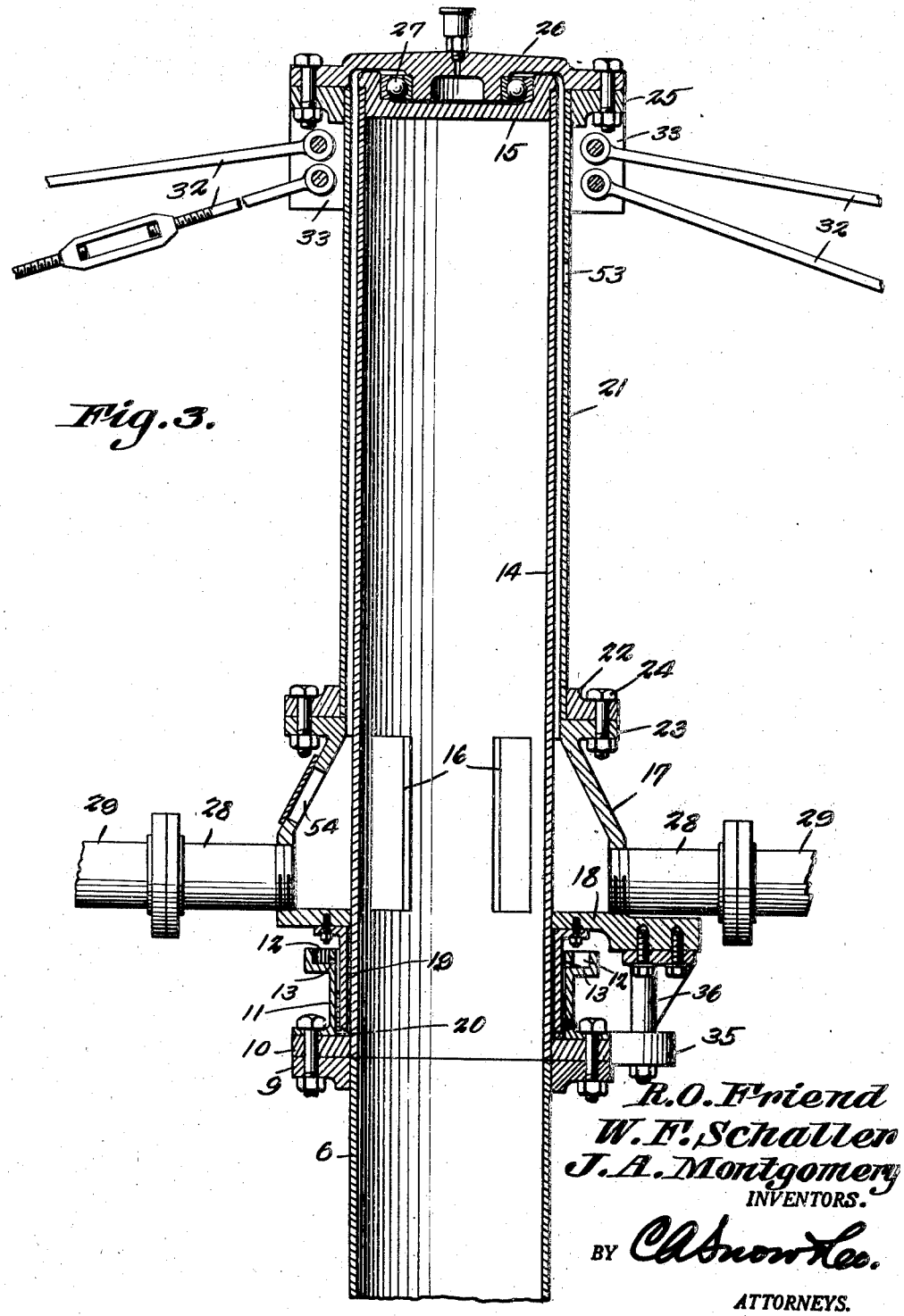

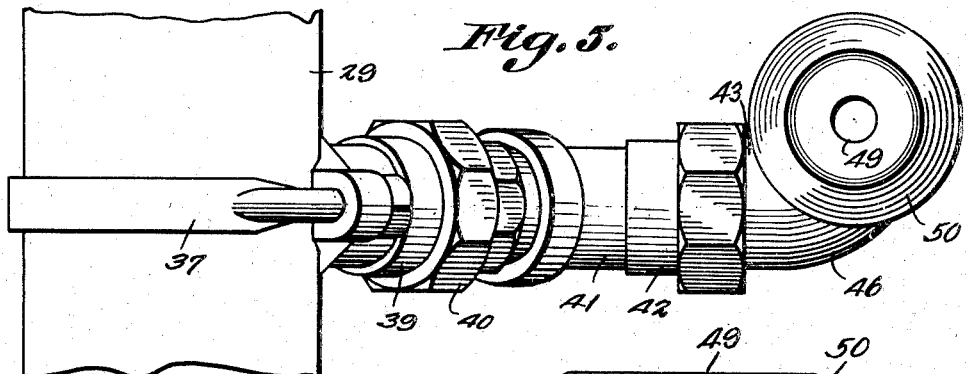
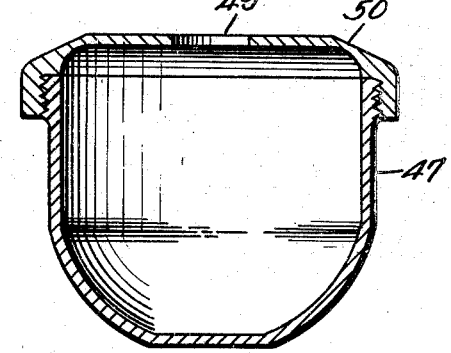
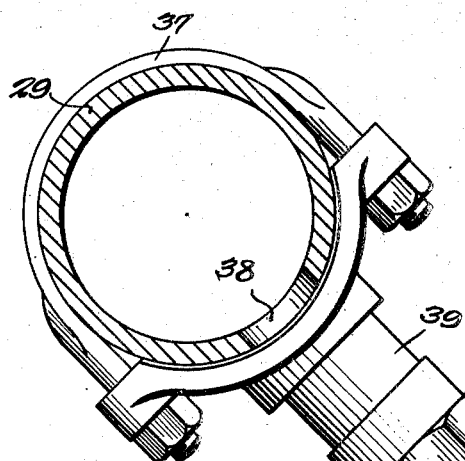
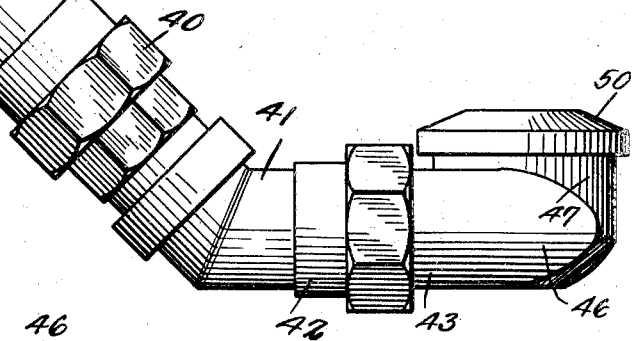
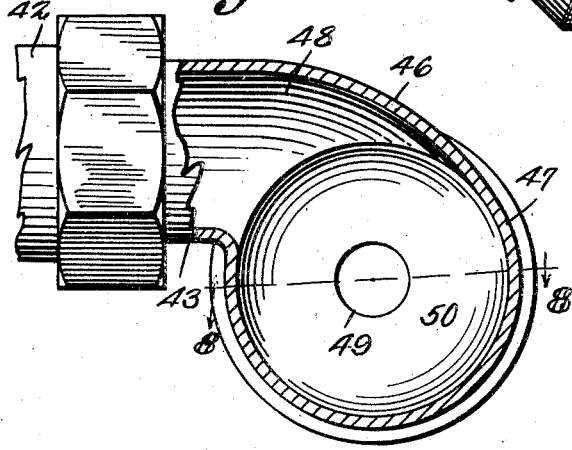

2,301,025

UNITED STATES PATENT OFFICE 2,301,025

ROTARY DISTRIBUTOR FOR TRICKLING FILTERS

Robert O. Friend, Chicago, and William F. Schaller, La Grange, Ill., and John A. Montgomery, Denver, Colo.

Application October 14, 1938, Serial No. 235,036

2 Claims. (Cl. 210—7)

This invention relates to a rotary distributor for trickling filters utilized in the treatment of sewage, filtration of water, etc.

While effective distribution of liquids over filter beds of comparative small areas can be accomplished with the use of a rotary disc, as shown in our co-pending application, Serial Number 224,798, it has been found that these discs do not meet the requirements where the filter bed is more than twenty-six feet in diameter.

Heretofore large size filter beds have been supplied with sewage or the like by fixed nozzles or by means of rotary distributors of either the reaction type or by motor driven units.

In operating trickling filters at capacities of from ten to thirty million gallons per acre per day it is very important that the application to the bed be made as uniform as possible within reasonable limits. In small filters this result is obtained in a very satisfactory manner by means of a rotating distributing disc such as shown in our co-pending application hereinafter referred to but where the filter beds are more than twenty-six feet in diameter a disc of that type is not very practical because of the power required to throw the liquid for any considerable distance by centrifugal force and because of the effect of the wind on the resulting distribution.

Distributors utilizing two, three or four arms have been devised but heretofore it has been impossible with them to obtain instantaneous coverage of more than five per cent of the filter bed. Obviously it is highly desirable, in order to increase the capacity of the filter and reduce operating costs, that the liquid be distributed instantaneously and substantially uniformly over more than five per cent of the bed area.

An object of the present invention is to provide a type of distributor the arms of which are so assembled that the greatest arc described between any two consecutive arms or their branches, irrespective of the size of the filter bed, will at no time be greater than eighteen (18') feet, and in most cases it will not exceed fifteen (15') feet.

It is a further object of the invention to provide the arms of the distributor with delivery nozzles through which the liquid will be discharged with a rain-like sprinkling effect rather than as a hosing effect delivered under pressure, as is true of other distributors of the arm type.

A still further object is to so arrange and mount the nozzles as to eliminate interior shoulders or other obstructions which would tend to retard the stream-like flow of the fluid to the nozzles.

A further object is to provide the apparatus with large throat nozzles having means whereby the sizes of the orifices can be changed without removing the nozzles themselves, each nozzle being so mounted that the angle of discharge with relation to the pipe or arm on which it is mounted can be easily changed in the field.

A still further object is to provide an arrangement of valves and shear gates whereby it becomes possible to use as many units of the distributor as desired.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the accompanying drawings the preferred form of the invention has been shown.

In said drawings:

Figure 1 is a plan view of a filter equipped with the present improvement, portions of the apparatus being removed and the parts being shown more or less in diagram.

Figure 2 is a central vertical section through the filter and showing the distributor associated therewith.

Figure 3 is a central vertical section on an enlarged scale of the feed pipes and the parts thereon.

Figure 4 is a view partly in elevation and partly in section of the distributor base.

Figure 5 is a plan view of a portion of a distributor arm and a nozzle connected thereto.

Figure 6 is a view partly in elevation and partly in section showing the parts illustrated in Figure 5.

Figure 7 is an enlarged section on line 7—7 of Figure 6.

Figure 8 is a section on line 8—8 of Figure 7.

Referring to the figures by characters of reference A designates the wall of a filter while the filter bed has been indicated at B. This wall can be provided with a fan chamber C, an under drain D and an outlet E for fluid entering the drain.

It is to be understood that the present improvement is designed for use in connection with filters of twenty-six feet or more in diameter and a filter when equipped with the present invention is provided preferably with a central pier 1 on which is mounted a base 2 having a laterally extending inlet 3 and an upwardly extended outlet 4, the inlet 3 being connected to the sewage feed pipe 5.

A stand pipe 6 is secured to and projects upwardly from the outlet 4 and the lower portion of the base carries a drain pipe 7 adapted to open downwardly into the drain D and containing a valve 8 which can be opened from above the surface of the filter bed whenever it is desired to clean out and drain the pipes.

The stand pipe 6 is provided at its upper end with a collar 9 to which is bolted or otherwise secured a ring 10 forming a circular track and also constituting the base to which is fastened the lower end of a sleeve 11. The upper end of this sleeve has an annular channel 12 in a laterally offset portion thereof and said channel is formed with drain openings 13 opening into the sleeve.

A stationary supporting pipe 14 is mounted on the upper end of the stand pipe 6 and is closed at its upper end by a cap 15 while a series of ports 16 are provided in pipe 14 near its lower end.

A manifold 17 extends around the apertured portion of the pipe 14 and has a base 18 with a depending sleeve 19 projecting into the space between pipe 14 and the sleeve 11. Thus it will be seen that by placing mercury, 20, in the space defined by sleeve 11, an efficient seal will be provided. A drum 21 is mounted at its lower end on the upper end of the manifold 17, this drum preferably being formed with an annular flange 22 held to a similar flange 23 on the manifold by means of bolts 24. The drum is spaced annularly from pipe 14 and has a collar 25 at its upper end bolted or otherwise secured to a head 26 which overlies the pipe 14 and projects into the cap 15, a suitable anti-friction bearing 27 being located between the head 26 and the cap 15 so that the drum is thus supported by pipe 14 for free rotation thereon.

A suitable number of tubular coupling members 28 are connected to and open into the manifold 17 and to each of them is secured the inner end of a radial distributing arm 29. These arms diverge outwardly and are preferably equipped with forked connections 30 carrying extensions or branches 31 of the arms and which branches diverge outwardly so that there will be no spaces in excess of eighteen feet between any two corresponding points on two adjoining distributing arms or their branches. The outer ends of the arms 29 and their branches 31 are preferably supported by means of tie rods 32 which converge upwardly towards and are attached to ears 33 or the like on the upper portion of the drum 21. The distributor arms and their branches are also preferably braced transversely by means of tie rods 34 located therebtween. Thus the entire series of distributing arms and their branches together with the drum 21 and manifold 17 to which they are connected, are free to rotate as one unit about the stationary supporting pipe 14. Sagging of this rotating structure can be prevented by providing wheels or rollers 35 on depending spindles 36 carried by the bottom of the manifold. These rollers can travel along the periphery of the ring 10. Said rollers can be regularly spaced about pipe 14 any desired distance apart.

Mounted on the distributing arms 29 and their branches 30 are sprinkling nozzles shown in detail in Figures 5 to 8 inclusive. The mounting of each nozzle includes a pipe clamp 37 secured about the distributing arm or its branch at a point where an opening 38 is formed in the pipe. A tubular arm 39 extends from the clamp and in communication with opening 38 so as to project radially. A union 40 connects this arm 39 to a street L 41 which, in turn, is connected by a two-third union 42 to the tubular stem 43 of nozzle 46. Thus the parts are held together without the formation of any interior shoulders or projections on which solid substances may accumulate and, instead, liquid is free to flow without restraint from the arm 39 at its port to the nozzle.

The head 47 of the nozzle is preferably circular and its inlet 48 leads thereto along arcuate lines so that when the liquid flows into the head of the nozzle it will be given a swirling action therein about the axis of an orifice 49 formed at the center of a removable cap 50 mounted on the head of the nozzle. Caps having orifices of different sizes can be used and these are freely interchangeable.

The angle of discharge can be adjusted for any elevation ranging from vertically downward upon the filter rock to vertically upward. Furthermore, it can be changed in a horizontal direction to coincide with any degree of the compass. This permits field adjustment of distribution without necessarily changing the size of the orifices outlet. Furthermore, it can be seen that by this field adjustment the rotating speed of the distributor can be completely controlled up to a definite maximum limit established by the load on the distributor. Furthermore, these large orifice nozzles, the minimum orifice being three-quarters (¾") of an inch in diameter, are practically noncloggable.

It has been found in practice that a nozzle such as herein described delivers liquid in a rain-like form, the result being similar to that obtained by the use of a sprinkler. The nozzles are so spaced that during the rotation of the apparatus, the area supplied with liquid from the nozzles instantaneously will be not less than twenty per cent of the filter bed.

Obviously the number of distributing arms and branches, if any, will depend largely upon the size of the filter bed and the disposition of the nozzles will always be such as to produce the results herein stated namely, that if the distributing arms should be held stationary the liquid discharged from all the nozzles at maximum flow will be instantly applied to not less than twenty per cent of the total area of the filter bed, this application being in rain-like form.

By providing arms having spaces of not more than eighteen feet between any two like points on adjoining arms or their branches at their outer ends, and by locating the nozzles so that each will have a coverage of approximately thirty-six inches in diameter, the resultant distribution of liquid will be effected uniformly during the rotation of the distributor at 4 R. P. M. or more over substantially the entire surface of the filter bed.

It is to be understood of course that if the distances between the ends of arms 29 does not exceed eighteen feet, it will be necessary to use the branches.

Obviously, by mounting the nozzles as explained their angles relative to the bed can be changed as desired. Also it is to be understood that valves can be located wherever desired on the arms of their branches so that as many as desired of the arms or their branches can be used thus adapting the mechanism to operate on reduced bed areas for seasonable operation. These valves can be located for example at points indicated at 51 and additional valves such as quick opening shear gates can be located at the outer ends of the pipes or the branches as indicated at 52.

It will be understood that in operation the sewage is directed upwardly within the pipe 6, thence radially through the port 16 in the manifold 17 from which it is directed to the arms 28 and the pipes 29 and thence to the nozzles, the reaction of the escaping fluid causing the apparatus to rotate so that the desired coverage of the filter bed is therefore effected.

To prevent trapping of gases within the manifold, and resulting mercury blowing, vents 53 are preferably located in the upper portion of drum 21 as shown in Figure 3.

Access to the interior of the manifold can be had through a normally closed hand hole 54.

What is claimed is:

1. A liquid distributor for delivering liquid instantly to not less than twenty per cent of the entire area of a filter bed of more than twenty-six feet in diameter comprising a stand pipe, a manifold supported for rotation on the pipe and in communication therewith for the reception of liquid from the stand pipe, tubular distributing arms extending from the manifold, a pair of diverging branches extending from each arm, one branch of each arm being substantially parallel with one of the branches on a next adjoining arm, the distance between corresponding points on any two adjoining arms and their branches being at no time more than eighteen feet, and upwardly discharging spraying nozzles carried by the arms and branches to deliver liquid to the filter bed, said arms and branches being movable about the stand pipe to uniformly distribute the delivered liquid over the entire surface of the filter bed.

2. The combination with the bed of a trickling filter, of means for delivering liquid in rain-like form instantaneously to an area not less than twenty per cent of the total area of the bed when the liquid is flowing at full capacity, said means including a stand pipe, a manifold mounted for rotation relative thereto and in constant communication therewith, tubular distributing arms diverging from and in communication with the manifold, a pair of diverging tubular branches extending from each of the arms, each branch being substantially parallel with one of the branches on a next adjoining arm, tie devices between the arms and branches holding them against relative annular movement, means for supporting the arms and branches at points beyond the manifold, and a plurality of upwardly discharging nozzles carried by the arms and branches.

ROBERT O. FRIEND.
WILLIAM F. SCHALLER.
JOHN A. MONTGOMERY.